United States Patent
Ljung et al.

(10) Patent No.: US 9,930,537 B2
(45) Date of Patent: Mar. 27, 2018

(54) DYNAMIC POSITIONING METHOD FOR MOBILE CELLS

(71) Applicant: Sony Mobile Communications Inc., Tokyo (JP)

(72) Inventors: Rickard Ljung, Helsingborg (SE); Zhinong Ying, Lund (SE); Linh Trang, Lund (SE); Peter C. Karlsson, Lund (SE); Magnus Persson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 9 days.

(21) Appl. No.: 14/994,878

(22) Filed: Jan. 13, 2016

(65) Prior Publication Data
US 2017/0142595 A1    May 18, 2017

Related U.S. Application Data

(63) Continuation of application No. PCT/EP2015/076415, filed on Nov. 12, 2015.

(51) Int. Cl.
| | |
|---|---|
| H04W 36/00 | (2009.01) |
| H04W 16/18 | (2009.01) |
| H04W 16/24 | (2009.01) |
| H04W 36/22 | (2009.01) |
| H04W 36/32 | (2009.01) |
| H04W 16/26 | (2009.01) |
| H04B 7/185 | (2006.01) |
| H04W 84/00 | (2009.01) |

(52) U.S. Cl.
CPC ........ *H04W 16/18* (2013.01); *H04B 7/18504* (2013.01); *H04W 16/24* (2013.01); *H04W 16/26* (2013.01); *H04W 36/22* (2013.01); *H04W 36/32* (2013.01); *B64C 2201/122* (2013.01); *H04W 84/005* (2013.01)

(58) Field of Classification Search
CPC ..... H04W 16/18; H04W 16/24; H04W 36/22; H04W 36/32
USPC .......................................... 455/440
See application file for complete search history.

(56) References Cited

U.S. PATENT DOCUMENTS

2014/0220923 A1    8/2014    Shoshan et al.

FOREIGN PATENT DOCUMENTS

EP           2938117 A1    10/2015

OTHER PUBLICATIONS

International Search Report and Written Opinion; dated Jul. 8, 2016; issued in International Patent Application No. PCT/EP2015/076415.

*Primary Examiner* — Charles Shedrick
(74) *Attorney, Agent, or Firm* — James C. Edwards; Moore & Van Allen PLLC

(57) ABSTRACT

Apparatus, systems, and methods are disclosed for determining dynamic positioning of mobile cells. Dynamic positioning provides for navigating a mobile cell, such as an unmanned aerial vehicle or the like, to a location suitable for offloading current network traffic, such that the suitable location maximizes offloading capabilities. The methodology describes takes into account both the current traffic load on the network and the location of the highest system capacity-intensive mobile terminals in determining an initial position for deploying the mobile cell. Additionally, the location of the deployed mobile cell is optimized, over time, based on tracking the direction of movement of the highest capacity-intensive mobile terminals, and, in some embodiments, service quality indicators provided by the mobile terminals and/or contextual information captured by the mobile cell apparatus.

17 Claims, 5 Drawing Sheets

DYNAMIC POSITIONING METHOD FOR MOBILE CELLS

FIELD OF THE INVENTION

In general, embodiments of the invention relate to mobile telecommunications and, more particularly, methods, apparatus, computer program products and the like for dynamically determining the positioning of a mobile cell, such as an airborne mobile cell or the like, based on current network load and highest system capacity using mobile terminals.

BACKGROUND

The market for high capacity mobile and wireless systems is continuously growing and the demand for further capacity enhancements is covered in the research and standardization efforts towards a $5^{th}$ generation mobile/wireless network, commonly referred to as 5G. The load placed on a mobile network, referred to as the mobile traffic load, is, in its basic nature, very dynamic with user and application variations occurring over time and geographic areas. Such, dynamic mobile traffic load is due in part to the fact that users are highly mobile and have a tendency to congregate in one area (e.g., shopping centers. conferences, festivals, concerts and the like); creating what are known as "traffic hotspots". Some aspects to the dynamic mobile traffic load challenges are supported by means of features, such as, Self-Organizing Networks (SON). The SON architecture can be a centralized, distributed or a hybrid solution, which is designed to make the planning, configuration, management, optimization and healing of mobile networks simpler and more efficient.

The usage of unmanned aerial vehicles (UAVs), commonly referred to as drones, for various different applications is in rapid development. As the technology improves to allow precision in maneuverability and positioning, as well as, more efficient power consumption, the possible uses of such technology also increases.

Therefore a need exists to develop systems, methods, apparatus, computer program products and the like that address problems associated with dynamic mobile traffic loads and, more specifically, traffic peaks that occur in response to mobile users congregating in a specified area. The dynamic and transitory nature of the problem means that the solution should also be dynamic, transitory to lessen the congestion in the network attributed to such traffic load peaks.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for dynamic offloading of cellular radio access networks using mobile cells, such as unmanned aerial vehicles (UAVs) (e.g., drones) or other mobile apparatus equipped with the necessary antenna and functionality. The mobile cell provides for a moving cell or kinetic network for providing radio access network capacity increase in dynamic locations within conventional cells where it most beneficial (i.e., "traffic hotspots" or the like). The mobile cell can, in turn, be connected to the backhaul network (e.g., eNodeBs/base stations or the like using high capacity wireless links, such as those currently be developed within 5G standardization.

In accordance with specific embodiments of the invention, determination of dynamic positioning of mobile cells is herein disclosed. Dynamic positioning provides for navigating the mobile cell advantageously in a mobile network to take into account current system capacity, i.e., locate suitable positions (geographic locations) for the moving/mobile cell to offload current network traffic, such that the suitable position maximizes offloading capabilities. Present embodiments of the invention take into account both the current traffic load on the network and the location of the highest system capacity-intensive mobile terminals in determining an initial position for deploying the mobile cell. Additionally, embodiments provide for optimizing the location of deployed mobile cells based on the directional movement of the highest capacity-intensive mobile terminals, and, in some embodiments, service quality indicators provided by the mobile terminals and/or contextual information captured by the mobile cell apparatus.

A method determining dynamic positioning of a mobile cell within a cellular network defines first embodiments of the invention. The method includes determining an area within a cell (e.g., a cell sector, pico cell or the like) to deploy the mobile cell based at least on current traffic load within the cell. The method further includes determining an initial optimal geographic location within the area of the cell to deploy the mobile cell based at least on a current geographic position of one or more currently highest system capacity-intensive mobile terminals within the area. The highest system capacity intensive mobile terminals are the mobile terminals within the determined area of the cell that generate/receive the most data, require highest transmit power or otherwise are the highest in intensive network resources.

In further specific embodiments the method includes deploying the mobile cell at the optimal geographic location within the area of the cell and, in response to deploying the mobile cell, offloading, from the cellular network to the mobile cell, one or more mobile terminals in a vicinity of the mobile cell.

In specific embodiments of the method, the step of determining the area within the cell to deploy the mobile cell may further include receiving, from the cellular network, information on the current traffic load in different areas of the cell. In other related embodiments of the method, the step of determining the area within the cell to deploy the mobile cell may further include receiving, from the cellular network, a request to move the mobile cell to one of a (1) the area within the cell, or (2) a geographic direction associated with the area within the cell.

In other specific embodiments of the method, the step of determining the initial optimal geographic location within the area of the cell to deploy the mobile cell includes (1) receiving, from mobile terminals in the area or from the cellular network, information on current system capacity usage by mobile terminals in the area, and (2) determining, based on the information, at least one of (i) a currently highest system capacity-intensive mobile terminal, or (ii) a predetermined number of currently highest system capacity-intensive mobile terminals.

In other specific embodiments of the method, the step of determining the initial optimal geographic location within the area of the cell to deploy the mobile cell includes determining the current geographic location of one or more currently highest system capacity-intensive mobile terminals within the area based on one or more of (i) mobile cell-derived geographic location information, or (ii) network-derived geographic location information.

In still further specific additional specific embodiments of the method, the step of determining the initial optimal geographic location includes determining the current geographic position of a currently highest system capacity-intensive mobile terminal. In such embodiments of the method, the initial optimal geographic location within the area of the cell to deploy the mobile cell is proximate to the current geographic location of the currently highest system capacity-intensive mobile terminal. In other related embodiments of the method, the step of determining the initial optimal geographic location includes determining a predetermined number of currently highest system capacity-intensive mobile terminals in the area that are within a predetermine distance of each other. In such embodiments of the method, the initial optimal geographic location within the area of the cell to deploy the mobile cell is proximate to a geographic area occupied by the predetermined number of currently highest system capacity-intensive mobile terminals.

In still further specific embodiments of the method, step of determining the initial optimal geographic location may be based on other factors in addition to the position of the highest system capacity-intensive mobile terminal(s). Such additional factors may include, but are not limited to, (1) characteristics of the current traffic, (2) current radio wave propagation environment, (3) Radio Frequency RF bands and wireless protocol in use by the cellular network and (4) contextual information collected by the mobile cell.

In additional embodiments the method further includes, in response to deploying and offloading, dynamically optimizing a geographic location of the mobile cell based at least on direction of movement of the one or more currently highest system capacity-intensive mobile terminals within the area. In such embodiments of the invention, dynamically optimizing a geographic location of the mobile cell may be further based on correlation of mobile cell mobility information communicated from the one or more currently highest system capacity-intensive mobile terminals within the area, wherein the mobile cell mobility information includes one or more of (i) Channel Quality Indicator (CQI), (ii) Received Signal Strength Indication (RSSI), or (iii) Received Signal Code Power (RSCP). Moreover, in further related embodiments of the method, dynamically optimizing a geographic location of the mobile cell may further include tracking movement of the one or more currently highest system capacity-intensive mobile terminals within the area based on Angle of Arrival (AoA) and Angle of Departure (AoD) techniques.

An apparatus for dynamic positioning within a cellular network defines second embodiments of the invention. The apparatus includes a computing platform including a memory and a processor in communication with the memory. Additionally, the apparatus includes a positioning module that is stored in the memory and executable by the processor. The positioning module is configured to determine an area within a cell to deploy a mobile cell based at least on current traffic load within the cell. In addition, the positioning module is configured to determine an initial optimal geographic location within the area of the cell to deploy the mobile cell based at least on a current geographic position of one or more currently highest system capacity-intensive mobile terminals within the area.

In specific embodiments of the invention, the apparatus further includes a mobile cell deployment module that is stored in the memory, executable by the processor, and configured to deploy the mobile cell at the optimal geographic location within the area of the cell.

In other specific embodiments the apparatus further includes an offloading module that is store in the memory, executable by the processor and configured to, in response to deploying the mobile cell, offload, from the cellular network to the mobile cell, one or more mobile terminals in a vicinity of the mobile cell.

In further specific embodiments of the apparatus, the positioning module is further configured to either (i) receive, from the cellular network, information on the current traffic load, or (ii) receive, from the cellular network, a request to move the mobile cell to one of a (1) the area within the cell, or (2) a geographic direction associated with the area within the cell.

In other specific embodiments of the apparatus, the positioning module is further configured to (1) receive, from mobile terminals in the area or from the cellular network, information on current system capacity usage by mobile terminals in the area, and (2) determine, based on the information, at least one of (i) a currently highest system capacity-intensive mobile terminal, or (ii) a predetermined number of currently highest system capacity-intensive mobile terminals.

In still further embodiments of the apparatus the positioning module is further configured to determine the current geographic location of one or more currently highest system capacity-intensive mobile terminals within the area based on one or more of (i) mobile cell-derived geographic locations, or (ii) network-derived geographic locations.

Moreover, in other specific embodiments of the apparatus, the positioning module is further configured to determine the current geographic position of a currently highest system capacity-intensive mobile terminal. In such embodiments of the apparatus, the initial optimal geographic location within the area of the cell to deploy the mobile cell is proximate to the current geographic location of the currently highest system capacity-intensive mobile terminal. In other related embodiments of the apparatus, the positioning module is further configured to determine a predetermined number of currently highest system capacity-intensive mobile terminals in the area that are within a predetermine distance of each other. In such embodiments of the apparatus, the initial optimal geographic location within the area of the cell to deploy the mobile cell is proximate to a geographic area occupied by the predetermined number of currently highest system capacity-intensive mobile terminals.

In still further embodiments of the apparatus, the mobile cell device includes one or more means for capturing contextual information, wherein the positioning module is further configured to use the captured contextual information as an additional basis for determining the initial optimal geographic location within the area of the cell to deploy the mobile cell. In such embodiments of the one or more means for capturing contextual information may include one or more of an image-capturing device, a weather assessment device, and a sensor.

In still further embodiments of the apparatus, the positioning module is further configured to, in response to deploying and offloading, dynamically optimize a geographic location of the mobile cell based at least on direction of movement of the one or more currently highest system capacity-intensive mobile terminals within the area. In such embodiments of the apparatus, the positioning module may be further configured to dynamically optimize the location of the mobile cell based on correlation of mobile cell mobility information communicated from the one or more currently highest system capacity-intensive mobile terminals within the area. The mobile cell mobility information includes one or more of (i) Channel Quality Indicator (CQI), (ii) Received Signal Strength Indication (RSSI), or (iii) Received Signal Code Power.

In other specific embodiment of the apparatus, the mobile cell device comprising a multi antenna array system, wherein the positioning module is further configured to dynamically optimize a geographic location of the mobile cell based on implementing the multi antenna array system to track movement of the one or more currently highest system capacity-intensive mobile terminals within the area based on Angle of Arrival (AoA) and Angle of Departure (AoD).

A computer program product including a non-transitory computer-readable medium defines third embodiments of the invention. The computer-readable medium includes a first set of codes for causing a computer determine an area within a cell to deploy the mobile cell based at least on current traffic load within the cell. The computer-readable medium additionally includes a second set of codes for causing a computer to determine an initial optimal geographic location within the area of the cell to deploy the mobile cell based at least on a current geographic position of one or more currently highest system capacity-intensive mobile terminals within the area.

Thus, systems, apparatus, methods, and computer program products herein described in detail below provide for determining dynamic positioning of mobile cells. Dynamic positioning provides for navigating a mobile cell, such as an unmanned aerial vehicle or the like, to a location suitable for offloading current network traffic, such that the suitable location maximizes offloading capabilities. The methodology described at length below takes into account both the current traffic load on the network and the location of the highest system capacity-intensive mobile terminals in determining an initial position for deploying the mobile cell. Additionally, other embodiments of the invention provide for optimizing the location of deployed mobile cells based on tracking the direction of movement of the highest capacity-intensive mobile terminals, and, in some embodiments, service quality indicators provided by the mobile terminals and/or contextual information captured by the mobile cell apparatus.

BRIEF DESCRIPTION OF THE DRAWINGS

Figure 1:
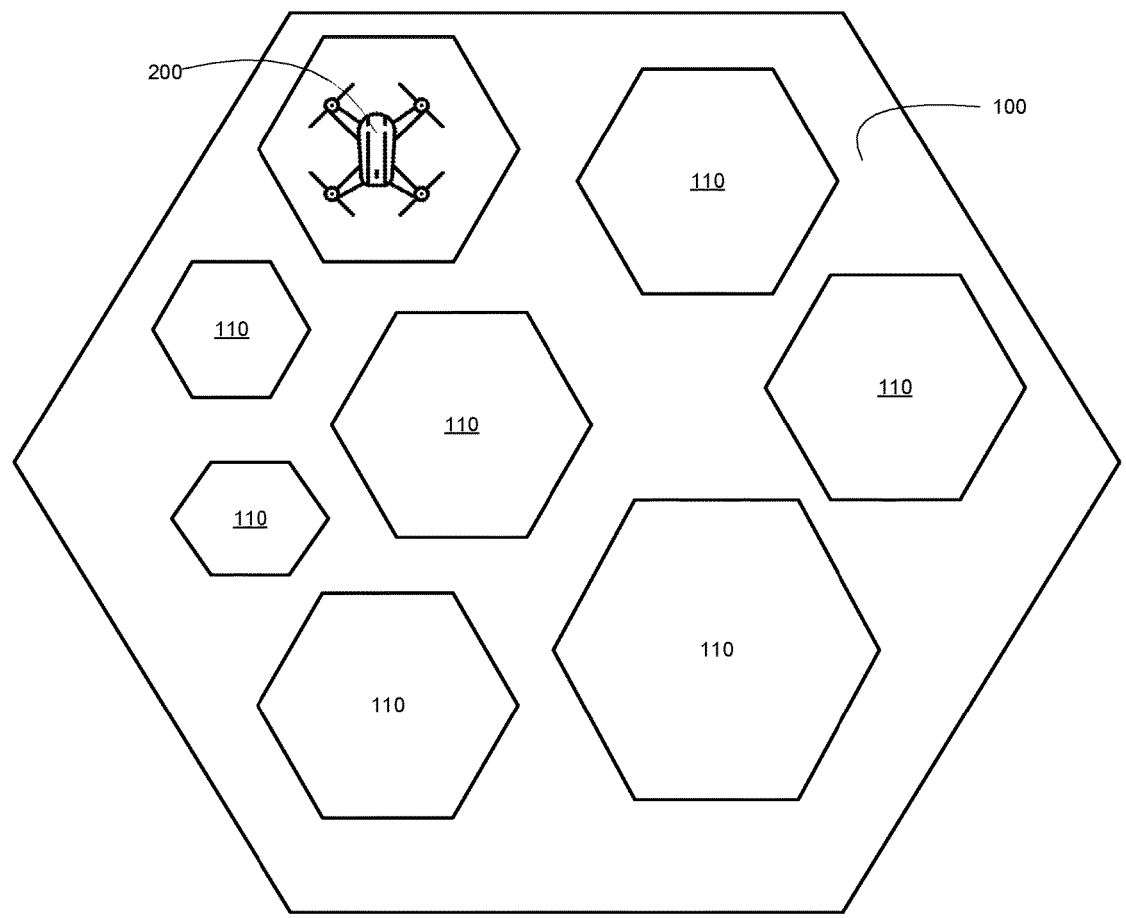
Figure 2:
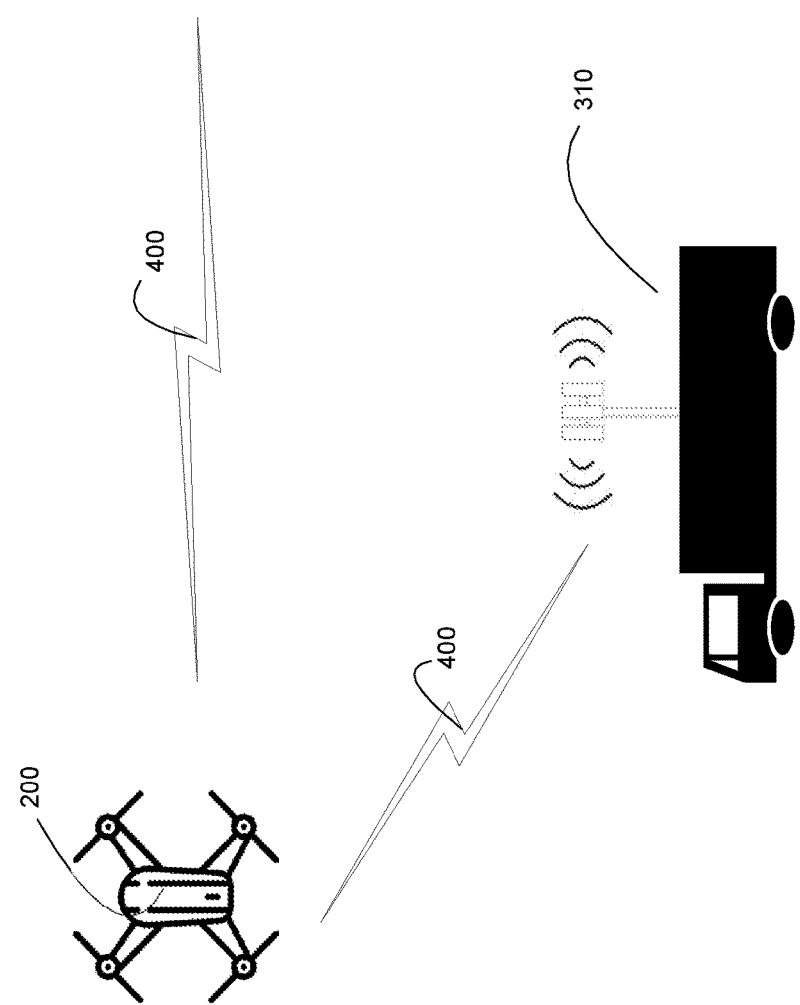
Figure 3:
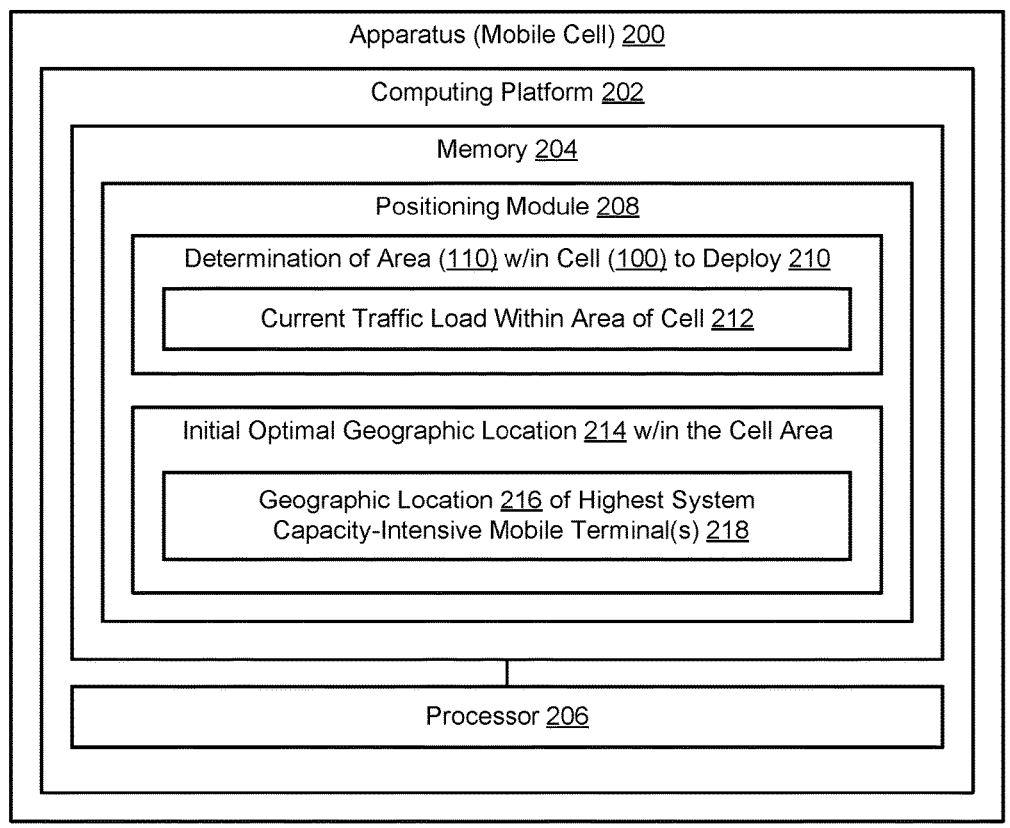
Figure 4:
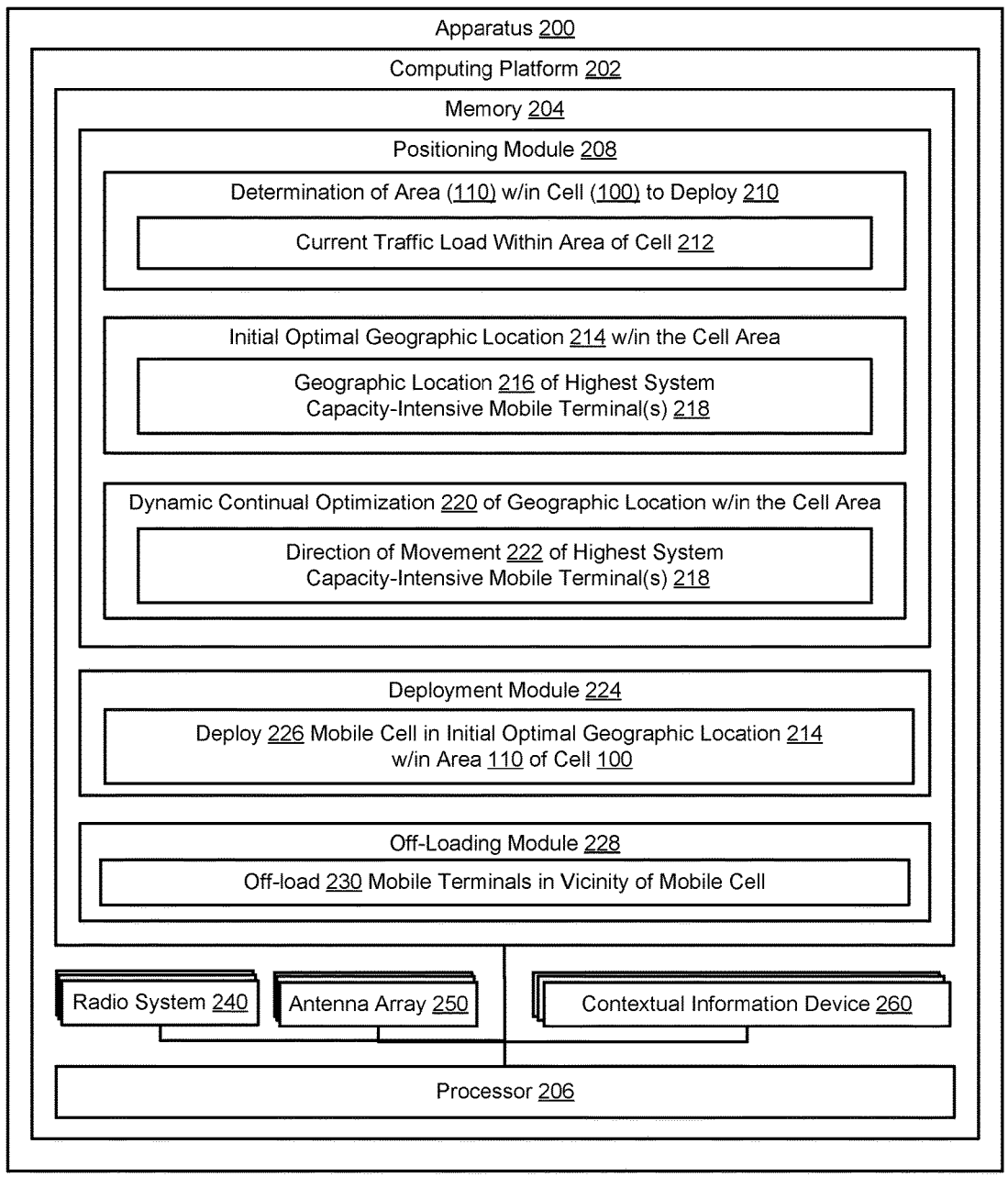
Figure 5:
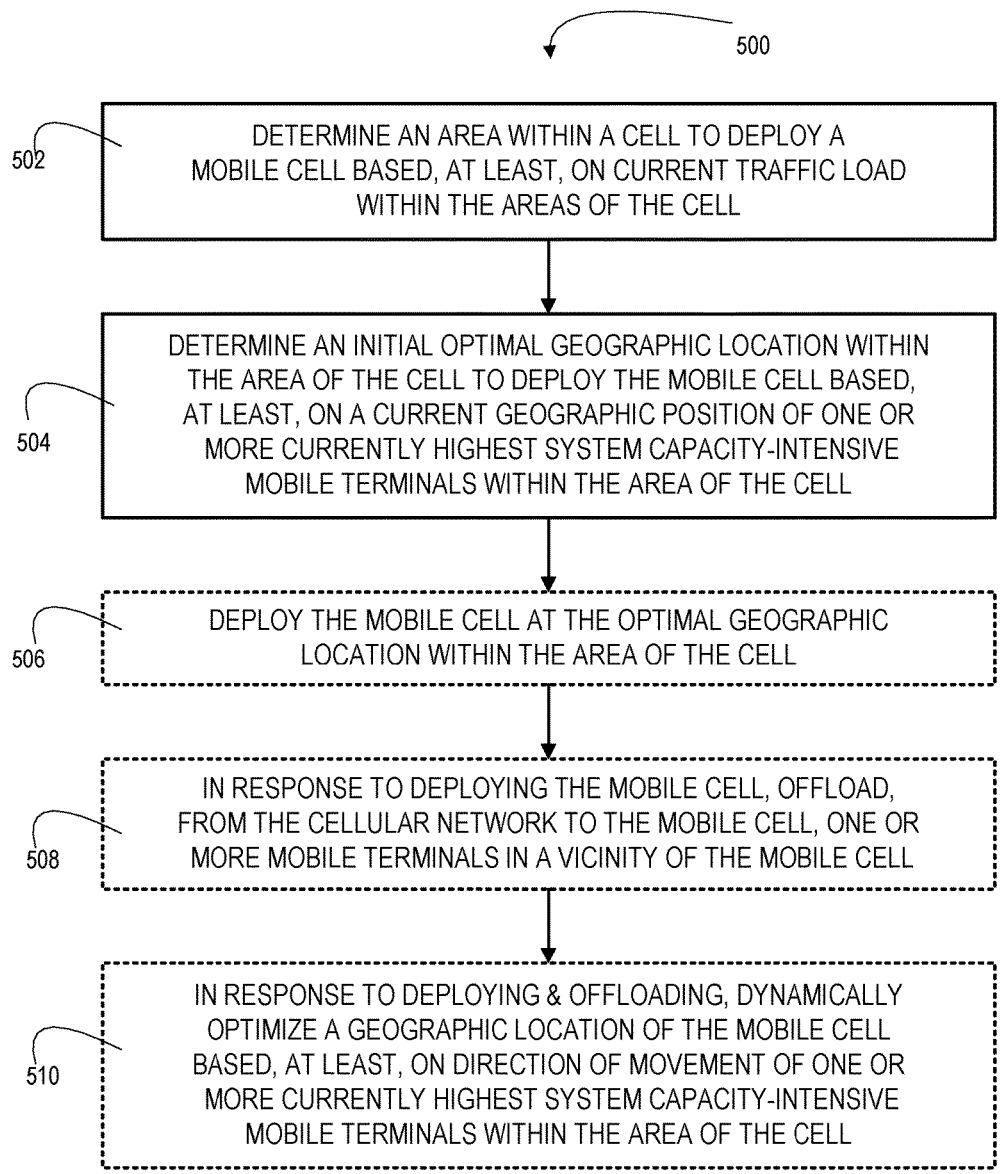

Having thus described embodiments of the invention in general terms, reference will now be made to the accompanying drawings, where:

FIG. 1 is a schematic diagram of a mobile cell being considered for deployment with a cell of a cellular system, in accordance with embodiments of the present invention; and FIG. 2 is a schematic diagram of a mobile cell connected to a backhaul network, in accordance with embodiments of the present invention;

FIG. 3 is a block diagram of an apparatus configured for determining positioning of a mobile cell within a cellular network, in accordance with embodiments of the present invention;

FIG. 4 is a block diagram of a more detailed apparatus configured for determining positioning of a mobile cell within a cellular network, in accordance with embodiments of the present invention; and FIG. 5 is a flow diagram of a method for determining the positioning of a mobile cell within a cellular network, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A mobile device may be referred to as a node or user equipment ("UE"). For the purpose of sending or receiving data, the device may connect to a wireless local area network ("WLAN") or a mobile communication network (including evolution of 3GPP) LTE releases and $5^{th}$ Generation ("5G") LTE releases). Any network described herein may have one or more base stations ("BS") and/or access points ("AP").

As discussed in detail herein, the present invention provides for determining the dynamic positioning of mobile cells, such as unmanned aerial vehicles (UAVs) (e.g., drones) or other mobile apparatus equipped with the necessary antenna and functionality. Specifically, embodiments of the invention, provide for determining the initial positioning of the mobile cells based on the current traffic load in the network and the location of the highest system capacity-intensive mobile terminal(s) in determining an initial position for deploying the mobile cell. Additionally, embodiments of the invention provide for optimizing the location of deployed mobile cells based on the directional movement of the highest capacity-intensive mobile terminals, and, in some embodiments, service quality indicators provided by the mobile terminals and/or contextual information captured by the mobile cell apparatus.

The mobile cell provides for a moving cell or kinetic network for providing radio access network capacity increase in dynamic locations within conventional cells where it most beneficial (i.e., "traffic hotspots" or the like). The mobile cell can, in turn, be connected to the backhaul network (e.g., eNodeBs/base stations or the like using high capacity wireless links. Dynamic positioning of mobile cells provides for navigating the mobile cell advantageously in a mobile network to take into account current system capacity, i.e., locate suitable positions (geographic locations) for the moving/mobile cell to offload current network traffic, such that the suitable position maximizes offloading capabilities.

Referring to FIG. 1 a schematic diagram is presented of a mobile cell 200 that is deployed within a stationary area 110 of a stationary cell 100; in accordance with embodiments of the present invention. The mobile cell 200 depicted is a drone-type device, although any unmanned aerial vehicle (UAV) or other mobile apparatus equipped with the necessary antenna and functionality may be employed. In specific embodiments of the invention, the mobile cell 200 is a multi-radio and/or multi-antenna device. For example, the mobile cell 200 may be equipped with LTE (Long Term Evolution) cellular band radio coverage with sector beam functionality and/or cm and mm distributed MIMO (Multiple-Input, Multiple-Output) system for 5G (Fifth Generation) configured for support of high data rate backhaul and mm wave mobile terminals with multi-beam function (e.g., mm wave cellular system with sector array antenna to link to mobile terminals). In addition, the mobile cell 200 may include a 4G (Fourth generation) LTE cellular band antenna array having omni coverage either with an omni antenna array or sector antenna array.

The mobile cell 200 is positioned dynamically within an area 110 (otherwise referred to as a cell segment or picocell) of the cell (otherwise referred to as a macrocell) to offload traffic in an optimal manner. In accordance with embodiments of the present invention, a determination may be made that the area 110 occupied by the mobile cell currently has the highest traffic load and/or a highest traffic peak, commonly referred to as a "traffic hotspot". Once the area 110 of the cell 100 has been determined, the invention further provides for determining the optimal precise positioning with the area 110 of the cell based on data that indicates which mobile terminals within the area are the most capacity intensive from a network perspective, i.e., which mobile terminals consume the most network resources, such as data generation/consumption, power and the like.

Referring to FIG. 2 a schematic diagram is presented that illustrates mobile cell 200 wireless connectivity to backhaul network systems/apparatus 300 and 310, in accordance with embodiments of the present invention. In this regard, mobile cell 200 may be configured to be in wireless communication 400 with a conventional stationary eNodeB/base station 300 and/or in wireless communication 400 with a temporal mobile eNodeB/base station 310, which is typically implemented for transitory events at which mobile users may congregate, such as conventions, festivals, concerts, sporting events and the like. In accordance with the present invention, mobile cell 200 may be configured to receive traffic load data from the backhaul network systems 300 and/or 310, as well as information related to the highest system capacity-intensive mobile terminals in a determined area of the cell and information related to the geographic allocation of such mobile terminals.

Referring to FIG. 3 is block diagram is presented of an apparatus/mobile cell 200 for determining dynamic positioning of the mobile cell, in accordance with embodiments of the present invention. The mobile cell 200 includes a computing platform 202 having a memory 204 and a at least one processor 206 in communication with the memory 204. The memory 204 of mobile cell 200 includes positioning module 208 that is configured to dynamically determine positioning for the mobile cell 200, in accordance with embodiments of the invention.

Specifically, positioning module 208 is configured to determine 210 an area 110 within a cell 100 to deploy the mobile cell 200 based, at least, on current traffic load 212 within the areas of the cell. The determined area 110 of the cell 100, otherwise referred to as a cell sector or picocell, is generally the area having the highest current traffic load 212. In specific embodiments of the invention, the positioning module 208 is configured to receive, via core network signaling, information related to current traffic load and, in response to receiving the information, the positioning module 208 determines 210 the area 110 within the cell 100 to which the mobile cell is deployed. In other embodiments of the invention, the positioning module 208 is configured to receive a request from the network (e.g., an eNodeB/base station), which is aware of current traffic load conditions, for the mobile cell to move to a defined cell area 110 or move in in predetermined direction (e.g., the direction at which the current traffic load is highest). In such embodiments of the invention, the positioning module 208 may be not be required to have knowledge of the current traffic load conditions.

In addition, positioning module 208 is further configured to determine an initial optimal geographic location 214 within the cell area. The initial optimal geographic location 214 is determined based, at least, on the current geographic location/position 216 of one or more currently highest system capacity-intensive mobile terminals 218 within the area 110 of the cell 100. Highest system capacity intensive mobile terminals 218 are those mobile terminals that are exhausting network resources, such as generating/receiving data, transmit power or other radio related resources, at the highest rate. In specific embodiments of the method, the initial optimal geographic location 216 for the mobile cell 200 is configured to be proximate (such as, a predetermined distance and/or direction) to the current location of the currently highest system capacity-intensive mobile terminal (i.e., the top/highest system capacity-intensive mobile terminal is determinative of the initial optimal geographic location to which the mobile cell is deployed). While in other embodiments of the method, the initial optimal geographic location 216 for the mobile cell 200 is configured to be proximate to the current location of the currently highest system capacity-intensive mobile terminal is configured to be proximate (such as, a predetermined distance and/or direction) to the geographic area occupied by a predetermined number of currently highest system capacity-intensive mobile terminals (i.e., a predetermined number of the highest system capacity-intensive mobile terminals is determinative of the initial optimal geographic location to which the mobile cell is deployed).

According to specific embodiments of the apparatus 200, the positioning module 208 is configured to receive, via core network signaling, information from the network related to the highest capacity-intensive mobile terminal(s). In addition, the positioning module 208 is configured to receive location information (such as Observed Time Difference of Arrival (OTDOA) location information or the like) associated with such mobile terminals from the network, or alternatively, the network can request the devices to provide the positioning module 208 with location-related information Global Navigation Satellite System (GNSS), barometric pressure sensors or the like and, the mobile cell can determine/derive the location of the highest capacity-intensive mobile terminal(s). The positioning module 208 may be configured to determine the locations of the mobile devices based on the network-derived information and/or the mobile terminal-derived information.

Referring to FIG. 4, a more detailed block diagram is presented of an apparatus/mobile cell 200 for determining dynamic positioning of the mobile cell, in accordance with embodiments of the present invention. Specifically, FIG. 4 highlights alternate embodiments of the invention. As previously discussed, apparatus/mobile cell 200 includes a computing platform 202 having a memory 204 and one or more processors 206 in communication with the memory 204. Additionally, mobile cell 200 may include multiple radio systems 240 to accommodate different cellular networks, standards and protocols and multiple antenna arrays 250, such as a 4G LTE cellular band antenna array having omni coverage made possible by inclusion of an omni antenna array or a sector antenna array.

Memory 104 may comprise volatile and non-volatile memory, such as read-only and/or random-access memory (RAM and ROM), EPROM, EEPROM, flash cards, or any memory common to computer platforms. Further, memory 104 may include one or more flash memory cells, or may be any secondary or tertiary storage device, such as magnetic media, optical media, tape, or soft or hard disk. Moreover, memory 104 may comprise cloud storage, such as provided by a cloud storage service and/or a cloud connection service.

Further, processor 106 may be an application-specific integrated circuit ("ASIC"), or other chipset, processor, logic circuit, or other data processing device. Processor 106 or other processor such as ASIC may execute an application programming interface ("API") (not shown in FIG. 4) that interfaces with any resident programs or modules, such as positioning module 208, deployment module 224 and/or off-loading module 228 and routines, sub-modules associated therewith or the like stored in the memory 204 of computing platform 202.

Processor 206 includes various processing subsystems (not shown in FIG. 4) embodied in hardware, firmware, software, and combinations thereof, that enable the functionality of mobile cell 200 and the operability of the system on a cellular network. For example, processing subsystems allow for initiating and maintaining communications and exchanging data with other network apparatus. For the disclosed aspects, processing subsystems of processor 206 may include any subsystem used in conjunction with positioning module 208, deployment module 224 and/or off-loading module 228 and related algorithms, sub-algorithms, modules, sub-modules thereof.

Computer platform 202 may additionally include a communications module (not shown in FIG. 4) embodied in hardware, firmware, software, and combinations thereof, that enables communications among the various components of the computing platform 202, as well as between the other networked apparatus. Thus, communication module may include the requisite hardware, firmware, software and/or combinations thereof for establishing and maintaining a network communication connection.

As previously discussed in relation to FIG. 3, memory 204 of computing platform 12 stores positioning module 208 that is configured to dynamically determine positioning for the mobile cell 200, in accordance with embodiments of the invention.

Specifically, positioning module 208 is configured to determine 210 an area 110 within a cell 100 to deploy the mobile cell 200 based, at least, on current traffic load 212 within the areas of the cell. In addition, positioning module 208 is further configured to determine an initial optimal geographic location 214 within the cell area. The initial optimal geographic location 214 is determined based, at least, on the current geographic location/position 216 of one or more currently highest system capacity-intensive mobile terminal(s) 218 within the area 110 of the cell 100.

Moreover, in optional embodiments of the invention, memory 204 of computing platform 202 stored deployment module 224 that is configured to deploy 226 the mobile cell 200 at the initial optimal geographic location 214 within the area 110 of the cell 100. It should be noted, that deployment may be a two-part step in which the mobile cell is initially deployed to the determined area of the cell and, subsequently, optimally located within the area cell once the optimal geographic location is determined. Such two-part deployment allows for the mobile cell to implement contextual information captured by the contextual information devices 260 cell while located within the area the cell as a means of further optimizing the initial optimal geographic location of the mobile cell.

In additional optional embodiments of the apparatus 200, memory 204 stores off-loading module 228 that is configured to, in response to deploying the mobile cell 200, off-load 230 one or more mobile terminals in the vicinity of the mobile cell 300 from the network to the mobile cell 200. The mobile terminals that are offloaded will typically include the highest system capacity-intensive mobile terminal(s); however, such offloading does not need to be exclusive nor does it need to include all of the highest system capacity-intensive mobile terminals.

Once deployment and offloading have occurred, the positioning module 208 is further configured to dynamically and continually optimize 220 the geographic position of the mobile cell 20 based, at least, on direction of movement 222 of one or more currently highest system capacity-intensive mobile terminal(s) 218. It should be noted that the currently highest system-intensive mobile terminals 218 will change over time and, as such, the currently highest system capacity-intensive mobile terminals 218 used to determine the initial optimal geographic position 214 may differ from the currently highest system capacity-intensive mobile terminals 218 used to dynamically optimize 220 the location of the deployed mobile cell. The positioning module 2018 may be configured to determine direction of movement 220 of the mobile terminals by tracking movement based on Angle of Arrival (AoA) and Angle of Departure (AoD) techniques. In this regard, the dynamically optimized 220 geographic location of the mobile cell may include a direction of movement for the mobile cell in addition to or opposed to a specific geographic location.

In addition to determining dynamic optimal 220 geographic location of the mobile cell based on direction of movement 222 of the mobile terminals, the positioning module 218 may be configured to implement other factors and information to more precisely determine the optimal geographic location. As previously mentioned, the mobile cell may include contextual information device 260 (e.g., image capturing device, environmental condition-related sensors and any other sensors) that capture contextual information and the information may be used to more precisely determine the optimal geographic location of the mobile cell. In addition, since offloading provides for the mobile cell to be in direct connection with the mobile terminals, the positioning module 208 can receive mobile cell mobility information from the mobile terminals, such as, Channel Quality Indicator (CQI), Received Signal Strength Indication (RSSI), Received Signal Code Power (RSCP) and the like. This information can additionally be correlated by the positioning module 218 to more precisely determine the optimal geographic location of the mobile cell.

Referring to FIG. 5 a flow diagram is presented of a method 500 for determining the positioning of a mobile cell within a cellular network, in accordance with embodiments of the present invention. As previously noted, the mobile cell may be an unmanned aerial vehicle (UAV), such as a drone or any other mobile vehicle capable of delivering necessary network functionality. At Event 502, an area within a cell to which the mobile cell will be deployed is determined based, at least on, the current traffic load within the areas of the cell (i.e., where capacity in the cell is most needed). The area of the cell, otherwise referred to as a cell sector or picocell, that is determined to be the area to which the mobile cell is to be deployed is generally the area having the highest current traffic load; however, other factors may be used such that the area that is determined to be the area to which the mobile cell is to be deployed is an area other than the area of highest current traffic load. In specific embodiments of the invention, the mobile cell is configured to receive, via core network signaling, information related to current traffic load and, in response to receiving the information, the mobile cell determines the area within the cell to which the mobile cell is deployed. In other embodiments of the invention, the mobile cell can receive a request from the network (e.g., an eNodeB/base station), which is aware of current traffic load conditions, for the mobile cell to move to a defined cell area or move in in predetermined direction (e.g., the direction at which the current traffic load is highest). In such embodiments of the invention, the mobile cell may be not be required to have knowledge of the current traffic load conditions.

At Event 504, the initial optimal geographic location/position within the area of the cell to deploy the mobile cell is determined. The initial optimal geographic location is determined based, at least, on the current geographic position of one or more currently highest system capacity-intensive mobile terminals within the area of the cell. As previously discussed, highest system capacity intensive mobile terminals are those mobile terminals that are exhausting network resources, such as generating/receiving data, transmit power or other radio related resources at the highest rate. In specific embodiments of the method, the initial optimal geographic location for the mobile cell is configured to be proximate (such as, a predetermined distance and/or direction) to the current location of the currently highest system capacity-intensive mobile terminal (i.e., the top/highest system capacity-intensive mobile terminal is determinative of the initial optimal geographic location to which the mobile cell is deployed). While in other embodiments of the method, the initial optimal geographic location for the mobile cell is configured to be proximate to the current location of the currently highest system capacity-intensive mobile terminal is configured to be proximate (such as, a predetermined distance and/or direction) to the geographic area occupied by a predetermined number of currently highest system capacity-intensive mobile terminals (i.e., a predetermined number of the highest system capacity-intensive mobile terminals is determinative of the initial optimal geographic location to which the mobile cell is deployed).

According to specific embodiment of the method, the mobile cell is configured to receive, via core network signaling, information from the network related to the highest capacity-intensive mobile terminal(s). In addition, the mobile cell is configured to receive location information (such as Observed Time Difference of Arrival (OTDOA) location information or the like) associated with such mobile terminals from the network, or alternatively, the network can request the devices to provide the mobile cell with location-related information Global Navigation Satellite System (GNSS), barometric pressure sensors or the like and, the mobile cell can determine/derive the location of the highest capacity-intensive mobile terminal(s).

Moreover, in addition to determining the initial optimal geographic location based on the current location of the highest system capacity-intensive mobile terminal(s), the method provides for other information to be used as factors in determine a more precise optimal geographic location. Such factors may include, but are not limited to, characteristics of the current network traffic, current radio wave propagation environment, and the RF (Radio Frequency bands and wireless protocol(s) in use by the network. In addition, the determination may rely on contextual information captured by the mobile cell once the mobile cell is located in the determined area of the cell. The contextual information may include, but is not limited to images (which provide line-of-sight information), weather-related information or any other context information captured by one or more sensors. Such contextual information provides for the mobile cell to able to effectively estimate and predict the capacity and coverage need of a precise geographic area in order for the mobile cell to position itself in an optimal location.

At optional Event 506, the mobile cell is deployed at the optimal geographic location within the cell. As previously noted, that deployment may be a two-part step in which the mobile cell is initially deployed to the determined area of the cell and, subsequently, optimally located within the area cell once the optimal geographic location is determined. Such two-part deployment allows for the mobile cell to implement contextual information captured by the mobile cell while located within the area the cell as a means of further optimizing the initial optimal geographic location of the mobile cell.

At optional Event 508, once the mobile cell has been deployed, one or more of the mobile terminals in the vicinity of the mobile cell are offloaded from the network (eNodeB or the like) to the mobile cell. It should be noted that the mobile terminals that are offloaded may include the highest system capacity-intensive mobile terminal(s); however, such offloading does not need to be exclusive to the highest system capacity-intensive mobile terminal nor does it need to include all of the highest system capacity-intensive mobile terminals.

At optional Event 510, once the mobile cell has been deployed and offloading occurs, the geographic location of the mobile cell is configured to dynamically optimized based, at least, on direction of movement of one or more currently highest system capacity-intensive mobile terminal(s). It should be noted that the currently highest system-intensive mobile terminals will change over time and, as such, the currently highest system capacity-intensive mobile terminals used to determine the initial optimal geographic position may differ from the currently highest system capacity-intensive mobile terminals used to dynamically optimize the location of the deployed mobile cell. The movement of the mobile terminals may be determined by the mobile cell by tracking movement based on Angle of Arrival (AoA) and Angle of Departure (AoD) techniques. In this regard, the dynamically optimized geographic location of the mobile cell may include a direction of movement for the mobile cell in addition to or opposed to a specific geographic location.

In addition to determining dynamic optimal geographic location of the mobile cell based on direction of movement of the mobile terminals, other factors and information at the disposal of the mobile cell may be used to more precisely determine the optimal geographic location. As previously mentioned, the mobile cell may include means for capturing contextual information (e.g., image capturing device, environmental condition-related sensors and any other sensors) at such contextual information may be used to more precisely determine the optimal geographic location of the mobile cell. In addition, since the mobile terminals are connected to the mobile cell, the mobile cell can receive mobile cell mobility information from the mobile terminals, such as, Channel Quality Indicator (CQI), Received Signal Strength Indication (RSSI), Received Signal Code Power (RSCP) and the like. This information can additionally be correlated by the mobile cell to more precisely determine the optimal geographic location of the mobile cell.

Moreover, since the mobile cell and the mobile terminals connected to a mobile cell are, in many instance, moving, the mobile cell and/or mobile terminals may be moving in a direction of a neighboring cell. As such, high system capacity-intensive mobile terminals in the neighboring cell may benefit from being connected to the mobile cell. In such instances, the neighboring cell may conduct a handoff to offload the high system capacity-intensive mobile terminals to the mobile cell. The hand-off may be a full handoff, in which the mobile terminal is handed-off in total to the mobile cell or a partial hand-off, in which the mobile cell is designated as a secondary cell (e.g., data transmissions occur via the mobile cell, while control signals occur via the primary macrocell).

Thus, systems, apparatus, methods, computer program products and the like described above provide for provide for determining dynamic positioning of mobile cells. Dynamic positioning provides for navigating a mobile cell, such as an unmanned aerial vehicle or the like, to a location suitable for offloading current network traffic, such that the suitable location maximizes offloading capabilities. According to the embodiments of the invention described above dynamic positioning of mobile cells takes into account both the current traffic load on the network and the location of the highest system capacity-intensive mobile terminals in determining an initial position for deploying the mobile cell. Additionally, the location of the deployed mobile cell is optimized, over time, based on tracking the direction of movement of the highest capacity-intensive mobile terminals, and, in some embodiments, service quality indicators provided by the mobile terminals and/or contextual information captured by the mobile cell apparatus.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for dynamic positioning of a mobile cell within a cellular network, the method comprising:
   receiving, at the mobile cell, information on a current traffic load within a cell, wherein the mobile cell is an Unmanned Aerial Vehicle (UAV);
   determining, at the mobile cell, an area within the cell to deploy the mobile cell based at least on the current traffic load within the cell; and
   determining, at the mobile cell, an initial optimal geographic location within the area of the cell to deploy the mobile cell based at least on a current geographic position of one or more currently highest system capacity-intensive mobile terminals within the area, wherein the highest system capacity-intensive mobile terminals are defined as mobile terminals consuming a highest amount of network resources.

2. The method of claim 1, further comprising deploying the mobile cell at the optimal geographic location within the area of the cell.

3. The method of claim 2, further comprising, in response to deploying the mobile cell, offloading, from the cellular network to the mobile cell, one or more mobile terminals in a vicinity of the mobile cell.

4. The method of claim 1, wherein determining the initial optimal geographic location within the area of the cell to deploy the mobile cell, further comprises:
   receiving, from mobile terminals in the area or from the cellular network, information on current system capacity usage by mobile terminals in the area; and
   determining, based on the information, at least one of (i) a currently highest system capacity-intensive mobile terminal, or (ii) a predetermined number of currently highest system capacity-intensive mobile terminals.

5. The method of claim 1, wherein determining the initial optimal geographic position within the area of the cell to deploy the mobile cell, further comprises:
   determining the current geographic location of one or more currently highest system capacity-intensive mobile terminals within the area based on one or more of (i) mobile cell-derived geographic locations, or (ii) network-derived geographic locations.

6. The method of claim 1, wherein determining the initial optimal geographic location within the area of the cell to deploy the mobile cell further comprises determining the current geographic position of a currently highest system capacity-intensive mobile terminal, wherein the initial optimal geographic location within the area of the cell to deploy the mobile cell is proximate to the current geographic location of the currently highest system capacity-intensive mobile terminal.

7. The method of claim 1, wherein determining the initial optimal geographic location within the area of the cell to deploy the mobile cell further comprises determining a predetermined number of currently highest system capacity-intensive mobile terminals in the area that are within a predetermine distance of each other, wherein the initial optimal geographic location within the area of the cell to deploy the mobile cell is proximate to a geographic area occupied by the predetermined number of currently highest system capacity-intensive mobile terminals.

8. The method of claim 1, wherein determining the initial optimal geographic further comprises determining an optimal geographic location within the area of the cell to deploy the mobile cell based on one or more of (1) characteristics of the current traffic, (2) current radio wave propagation environment, (3) Radio Frequency (RF) bands and wireless protocol in use by the cellular network, and (4) contextual information collected by the mobile cell.

9. The method of claim 2, further comprising:
   in response to deploying, dynamically optimizing a geographic location of the mobile cell based at least on direction of movement of the one or more currently highest system capacity-intensive mobile terminals within the area.

10. The method of claim 9, wherein dynamically optimizing the geographic location of the mobile cell is further based on correlation of mobile cell mobility information communicated from the one or more currently highest system capacity-intensive mobile terminals within the area, wherein the mobile cell mobility information includes one or more of (i) Channel Quality Indicator (CQI), (ii) Received Signal Strength Indication (RSSI), or (iii) Received Signal Code Power (RSCP).

11. The method of claim 9, wherein dynamically optimizing a geographic location of the mobile cell further comprises tracking movement of the one or more currently highest system capacity-intensive mobile terminals within the area based on Angle of Arrival (AoA) and Angle of Departure (AoD).

12. A mobile cell device within a cellular network, the device comprising:
   a computing platform including a memory and a processor in communication with the memory; and
   a positioning module stored in the memory, executable by the processor, and configured to:
      receive information on a current traffic load within a cell;
      determine an area within the cell to deploy the mobile cell based at least on current traffic load within the cell, wherein the mobile cell is an Unmanned Aerial Vehicle (UAV); and
      determine an initial optimal geographic location within the area of the cell to deploy the mobile cell based at least on a current geographic position of one or more currently highest system capacity-intensive mobile terminals within the area, wherein the highest system capacity-intensive mobile terminals are defined as mobile terminals consuming a highest amount of network resources.

13. The apparatus of claim 12, further comprising a mobile cell deployment module stored in the memory, executable by the processor, and configured to deploy the mobile cell at the optimal geographic location within the area of the cell.

14. The apparatus of claim 13, further comprising an offloading module stored in the memory, executable by the processor and configured to, in response to deploying the mobile cell, offload, from the cellular network to the mobile cell, one or more mobile terminals in a vicinity of the mobile cell.

15. The apparatus of claim 12, wherein the positioning module is further configured to:
   receive, from mobile terminals in the area or from the cellular network, information on current system capacity usage by mobile terminals in the area; and
   determine, based on the information, at least one of (i) a currently highest system capacity-intensive mobile terminal, or (ii) a predetermined number of currently highest system capacity-intensive mobile terminals.

16. The apparatus of claim 12, wherein the positioning module is further configured to determine the current geographic location of one or more currently highest system capacity-intensive mobile terminals within the area based on one or more of (i) mobile cell-derived geographic locations, or (ii) network-derived geographic locations.

17. A computer program product comprising:
   a non-transitory computer-readable medium comprising:
      a first set of codes for causing a mobile cell to receive information on a current traffic load within a cell, wherein the mobile cell is an Unmanned Aerial Vehicle (UAV);
      a second set of codes for causing the mobile cell to determine an area within the cell to deploy the mobile cell based at least on the current traffic load within the cell; and
      a third set of codes for causing the mobile cell to determine an initial optimal geographic location within the area of the cell to deploy the mobile cell based at least on a current geographic position of one or more currently highest system capacity-intensive mobile terminals within the area, wherein the highest system capacity-intensive mobile terminals are defined as mobile terminals consuming a highest amount of network resources.

* * * * *